INVENTOR.
GERD KIPER
BY ERWIN von WASIELEWSKI

Michael J. Striker
Atty

Aug. 26, 1969   G. KIPER ET AL   3,463,072
SHUTTER FOR PHOTOGRAPHIC CAMERAS
Filed Oct. 18, 1966   2 Sheets-Sheet 2

INVENTOR.
GERD KIPER
ERWIN von WASIELEWSKI
BY Michael J. Striker

United States Patent Office 3,463,072
Patented Aug. 26, 1969

3,463,072
SHUTTER FOR PHOTOGRAPHIC CAMERAS
Gerd Kiper and Erwin von Wasielewski, Munich, Germany, assignors to Agfa-Gevaert Aktiengesellschaft, Leverkusen, Germany
Filed Oct. 18, 1966, Ser. No. 587,461
Claims priority, application Germany, Oct. 29, 1965, A 24,646
Int. Cl. G03b 9/00
U.S. Cl. 95—53               4 Claims

ABSTRACT OF THE DISCLOSURE

A photographic shutter wherein movement of shutter blades to open position results in completion of a circuit including a signal lamp which lights up to indicate to the user of the camera that the shutter is open. The circuit is deenergized in response to closing of the shutter.

---

The present invention relates to shutters for photographic cameras. More particularly, the invention relates to improvements in shutters for movie cameras or still cameras which can provide shorter as well as relatively long exposure times.

Many presently known shutters for photographic cameras are very quiet so that the noise resulting from movement of one or more shutter blades to open or closed position is hardly perceptible, particularly if the exposure is made in an area in which the operator of the camera can hear other sounds. Therefore, it happens frequently that the user cannot hear the click when the shutter blades return to closed position, particularly if the exposure time is long. The exposure controls in recent types of cameras wherein the exposure time is selected by a light-sensitive resistor or cell as a function of the intensity of incoming light are practically noiseless so that they cannot by themselves indicate when the exposure is completed.

Accordingly, it is an important object of the present invention to provide a photographic camera with a shutter which is constructed and assembled in such a way that the user can immediately determine the position of the shutter blades even if the movement of such blades to open or closed position produces negligible noise.

Another object of the invention is to provide a shutter which enables the operator to determine the exact duration of the exposure time, particularly if the exposure time is long.

A further object of the invention is to provide a shutter of the just outlined characteristics which need not occupy more room than a conventional shutter.

An additional object of our invention is to provide a shutter which enables the operator to determine the position of shutter blades in a dark room and without necessitating a separate manipulation for such determination.

A concomitant object of the invention is to provide a shutter which enables the operator to determine the duration of the exposure time in automatic response to operation of the customary shutter release trigger.

Still another object of the invention is to provide a novel indicating device which may be installed in a shutter for photographic cameras.

Briefly stated, one feature of our invention resides in the provision of a shutter for photographic cameras which comprises shutter blade means movable between open and closed positions, composite actuating means operative to move the blade means between open and closed positions and including at least one setting member which is direcly coupled with the blade means and drive means for the setting member, and indicating means responsive to the operation of actuating means to indicate at least one position of the blade means.

For example, a setting member may carry a cam which changes the position of an index cooperating with a graduated scale so that the tip of the index points out on the scale such graduations which respectively indicate open and closed positions of the blades. Alternatively, the drive means may carry an index which can be placed into registry with one or more windows whereby the operator knows that the blades are in open or closed position, depending upon which of the windows is in registry with the index.

It is also possible to provide the shutter with electrically operated indicating means including a lamp, a bell or an analogous signal generator. The circuit of such signal generator can be completed in response to movement of blades to open position whereby the signal generator produces a visible and/or audible signal to indicate that the blades are held in open position.

The novel features which are considered as characteristic of the invention are set forth in particular in the appended claims. The improved shutter itself, however, both as to its construction and its mode of operation, together with additional features and advantages thereof, will be best understood upon perusal of the following detailed description of certain specific embodiments with reference to the accompanying drawings, in which:

Figure 1:
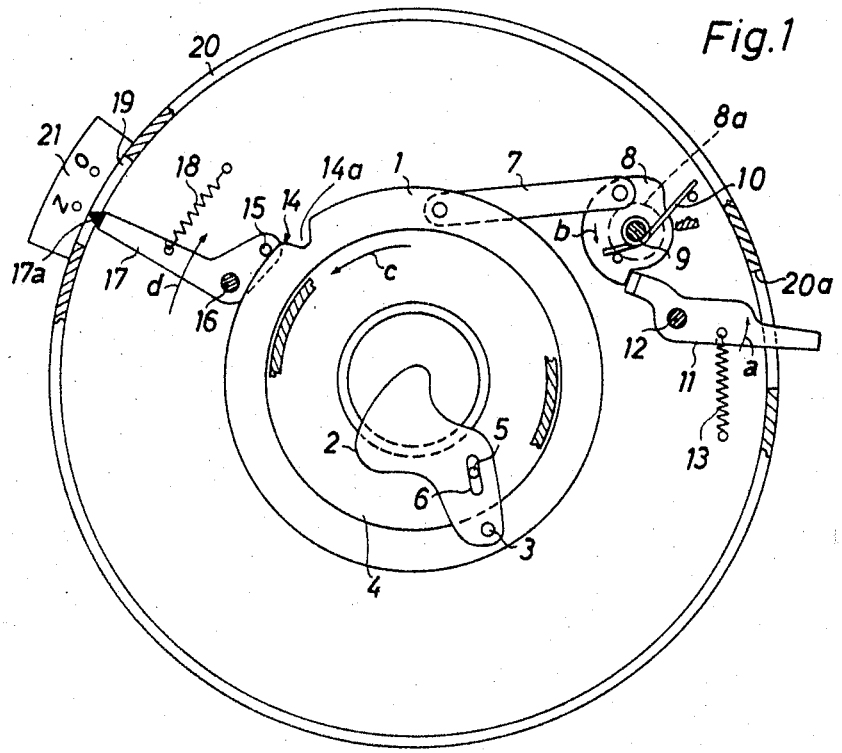
FIG. 1 is a diagrammatic sectional view of a shutter which is provided with mechanical indicating means.

FIG. 1 shows a shutter comprising a series of shutter blades 2 (only one shown) and a single setting ring 1 which is turnable back and forth about the optical axis to respectively move the blades to open and closed position. Each blade 2 is connected with the setting ring 1 by a pivot pin 3 and each blade is additionally provided with an elongated slot 6 which receives a pin 5 fixed to a stationary support 4. The setting ring 1 is turnable back and forth by a main drive member 8 which is fixed to a shaft 9 and is coupled to the ring 1 by a motion transmitting link 7. A torsion spring 10 biases the drive member 8 in a counterclockwise direction as indicated by an arrow b. The shaft 9 may be utilized to move the drive member to the cocked position shown in FIG. 1 in which the member 8 is held by one arm of a two-armed shutter release trigger 11. The other arm of the trigger 11 extends through a slot 20a of the shutter housing 20 and may be engaged by hand to turn about its shaft 12 against the opposition of a helical return spring 13. The parts 1, 7, 8 and 10 constitute composite actuating means for the blades 2, and the parts 7, 8, 10 constitute a drive for the setting ring 1.

The drive member 8 is controlled by a conventional retard or delay mechanism 8a which can be set to provide shorter as well as relatively long exposure times. This mechanism 8a may be of the mechanical, electrical or electromagnetic type and becomes effective when the drive member 8 covers approximately one-half of the distance from cocked to uncocked position. When the retard mechanism 8a is effective, the setting ring 1 maintains the shutter blades 2 in open position. The arrangement may be such that the retard mechanism 8a brings the drive member 8 and setting ring 1 to a complete standstill or that the drive member is allowed to advance very slowly toward uncocked position.

The indicating means of the shutter shown in FIG. 1 comprises a cam 14 which is affixed to or made integral with the setting ring 1 and is tracked by a follower 15 provided on one arm of a two-armed index or pointer 17 rockable about a fixed pin 16 and biased by a helical spring 18 to maintain the follower 15 is contact with the face of the cam 14. The tip 17a of the longer arm of the index 17 is movable along a fixed scale 21 and extends through a slot 19 of the shutter housing 20. The scale 21 has two graduations Z and O which respectively indicate that the blades 2 are held in closed and open positions. Instead of the scale 21, the indicating means of FIG. 1 could comprise a window and two differently colored flags provided on the index 17 as a substitute for the tip 17a. One of the flags would register with the window in response to movement of shutter blades 2 to open position and the other flag would be observable through the window when the shutter blades are closed. If desired, the scale 21 or the aforementioned window may be placed into the view finder.

FIG. 1 shows the drive member 8 in fully cocked position. If the user wishes to make an exposure, the retard mechanism 8a is set for a desired exposure time (or such exposure time may be selected automatically as a function of the intensity of light coming from a viewed scene or subject). The trigger 11 is then turned in a counterclockwise direction (arrow a) so that it releases the drive member 8 and the latter turns in a counterclockwise direction (arrow b) under the bias of the torsion spring 10. The link 7 turns the setting ring 1 in a counterclockwise direction (arrow c) to move the shutter blades 2 to open position. The follower 15 tracks the face of the cam 14 and enters a notch 14a when the blades 2 assume their open positions. Such entry of the follower 15 into the notch 14a is caused by the spring 18 which then places the tip 17a of the index 17 into registry with the graduation O to indicate that the shutter blades 2 are open. The direction of movement of the tip 17a into registry with the graduation O is indicated by an arrow d.

The retard mechanism 8a becomes effective when the follower 15 enters the notch 14a, i.e., when the shutter blades 2 are open. This mechanism then temporarily holds the drive member 8 against further movement in the direction of arrow b or retards the drive member sufficiently to insure that the blades 2 remain in open position for a desired period of time. Upon elapse of the exposure time, the retard mechanism 8a releases the drive member 8 so that the latter again follows the bias of the spring 10 and rapidly advances to uncocked position. The link 7 then turns the setting member 1 in a clockwise direction and the blades 2 return to closed position. Such clockwise movement of the setting member 1 expels the follower 15 from the notch 14a so that the tip 17a of the index 17 returns into registry with the graduation Z and the user of the camera can see that the blades 2 have returned to closed position.

Figure 2:
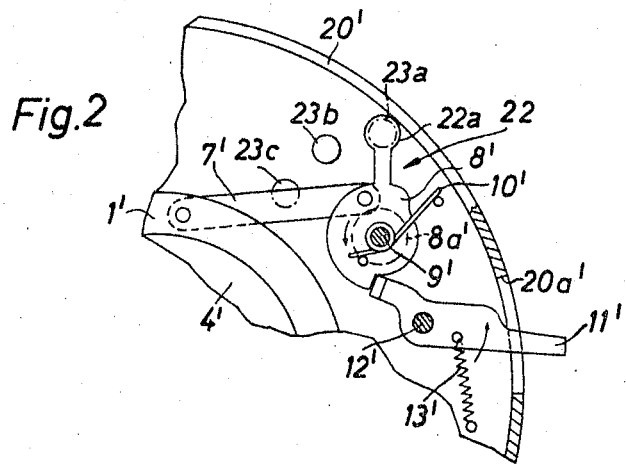
FIG. 2 is a fragmentary sectional view of a modified shutter which is provided with slightly different indicating means.

The structure shown in FIG. 1 could be modified still further by providing the cam 14 or an analogous cam directly on the drive member 8 and by placing the follower 15 adjacent to the drive member. A similar modification is shown in FIG. 2 wherein the indicating means includes an index 22 which is connected to or integral with the drive member 8'. All such parts of the shutter which are clearly analogous to or identical with the corresponding parts of the shutter shown in FIG. 1 are denoted by similar reference numerals each followed by a prime. The setting ring 1' need not be provided with a cam, such as the cam 14 of FIG. 1, and the scale 21 is replaced by three windows 23a, 23b, 23c which are provided in the housing 20' of the shutter. The windows 23a–23c are observable by the user. The rounded head 22a of the index 22 may be colored to be more readily observable. When this head 22a registers with the window 23a, the user knows that the drive member 8' is fully cocked and that the shutter blades (not shown in FIG. 2) are held in closed position. When the head 22a registers with the median window 23b, the user knows that the shutter is open, i.e., that the retard or delay mechanism is effective and holds the drive member 8' against movement to fully uncocked position. When the head 22a moves into registry with the window 23c, the shutter is closed again and the operator knows that the drive member 8' is uncocked. If desired, the housing 20' may be provided with suitable inscriptions or symbols placed adjacent to the windows 23a–23c to indicate the condition of the drive member 8' when the respective windows register with the index 22.

The structure shown in FIG. 2 is extremely simple and reliable. Also, it can indicate cocked, uncocked and retarded positions of the drive member 8' as well as the position of the shutter blades. However, and unless the index 22 is replaced by a link train or the like, it must be placed into immediate proximity of the drive member 8'. It is further clear that the index 22 may be connected with and then receives motion from the link 7' because the position of this link in uncocked position of the drive member 8' is different from that when the drive member is fully cocked.

Figure 3:
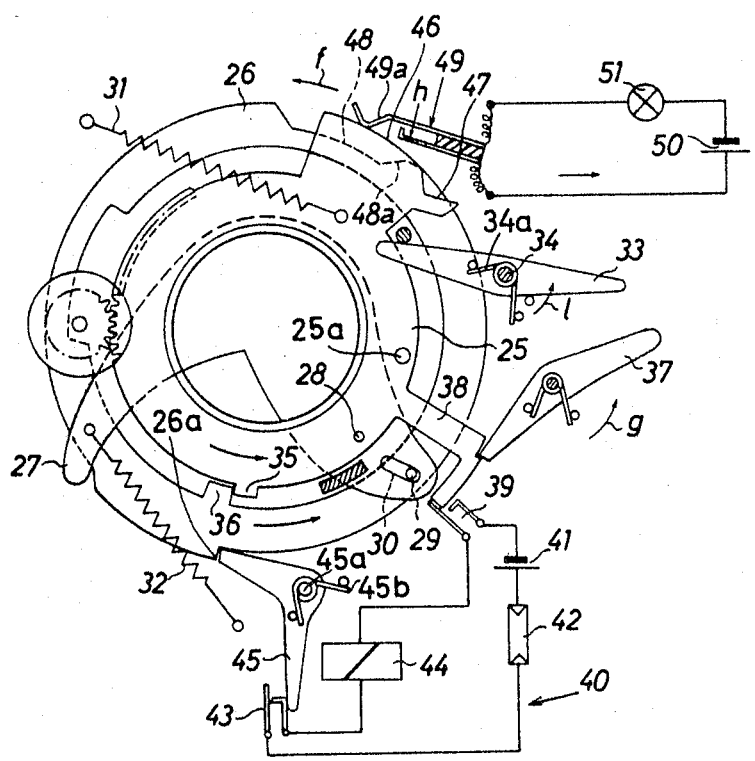
FIG. 3 is a diagrammatic sectional view of a third shutter having electrical indicating means.

FIG. 3 shows a modified shutter which comprises composite setting means including a leading setting ring 25 and a trailing setting ring 26. The shutter blades 27 (only one shown) are articulately connected with both setting rings by means of pins 28 on the ring 25 and pins 29 on the rings 26. The pins 29 extend into elongated slots 30 of the respective blades 27. The setting rings 25, 26 are respectively biased by return springs 31, 32 which tend to maintain them in uncocked positions. The means for cocking the setting rings 25, 26 comprises a drive member here shown as a cocking lever 33 mounted on a fixed shaft 34 and biased by a torsion spring 34a so that it normally assumes the idle position shown in FIG. 3. When the cocking lever 33 is turned in a counterclockwise direction (arrow 1), it engages a pin 25a of the leading setting ring 25 and moves the latter in a clockwise direction to the fully cocked position which is shown in FIG. 3. The ring 25 has a radially outwardly extending motion transmitting projection 35 which engages a radially inwardly extending motion receiving projection 36 of the trailing ring 26 so that the two rings are cocked simultaneously. A shutter release trigger 37 normally holds the leading setting ring 25 in cocked position by entering a recess in the radially outwardly extending arms 38 of the leading ring. The release trigger 37 is biased by a torsion spring and can be turned by hand (arrow g) to release the leading setting ring 25. The parts 25, 26, 31, 32, 33 constitute composite actuating means for the blades 27, and the parts 31, 32, 33 constitute a drive for the setting means 25, 26.

The retard or delay unit 40 of the shutter shown in FIG. 3 is of the electromagnetic type and comprises an electric circuit including a master switch 39 which is normally closed but is shown in open position because its movable contact is moved away from the fixed contact by the arm 38 when the leading setting ring 25 is held in cocked position. The master switch 39 is connected in series with a battery 41 or another suitable source of electrical energy, a light-sensitive resistor 42, a normally open control switch or interrupter switch 43 and an electromagnet 44. The armature of this electromagnet is constituted by a two-armed blocking lever 45 which is pivotable on a shaft 45a and is biased by a torsion spring 45b so that its upper arm abuts against a shoulder 26a when the trailing setting ring 26 is moved to cocked position. The lower arm of the blocking lever 45 then closes the control switch 43.

The indicating means of the shutter shown in FIG. 3 comprises a cam 46 provided on the leading ring 25 and constituting a first trip for a switch 49 connected in circuit with a signal generator lamp 51 and a battery 50. When the leading ring 25 is cocked, the cam 46 bears against the movable contact 49a of the switch 49 and maintains the latter in open position so that the lamp 51 is off. The cam 46 is provided with a notch 47 which receives the movable contact 49a when the leading ring 25 is free to follow the bias of its spring 31 and returns to uncocked position. The switch 49 then closes and the lamp 51 is on. The trailing ring 26 also comprises a cam 48 constituting a second trip and having a lobe 48a which engages the movable contact 49a and opens the switch 49 when the ring 26 is allowed to follow the bias of its spring 32 and returns to uncocked position. The lamp 51 is then off. This lamp may be replaced by a signal generator which can produce an audible signal or by an electromagnet which can move a pair of differently colored flags one of which will be visible when the shutter blades are open and the other of which will be visible when the shutter blades are closed. The electromagnet and the window for its flags are not shown in FIG. 3; such modification of the shutter shown in FIG. 3 will be readily understood with reference to the description of FIGS. 1 and 2.

The operation of the shutter shown in FIG. 3 is as follows:

In order to make an exposure, the operator will turn the shutter release trigger 37 in a counterclockwise direction (arrow g) to release the arm 38 of the leading setting ring 25 which latter then rotates in a counter-clockwise direction (arrow f) because the return spring 31 dissipates energy. Such movement of the leading ring 25 causes the pins 28 to move the shutter blades 37 to open position. At the same time, the arm 38 moves away from the movable contact of the master switch 39 which closes automatically and completes the circuit of the delay unit 40. Energization of the electromagnet 44 takes place with a delay which is determined by the lightsensitive resistor 42. In a manner well known per se, this resistor receives light from the viewed scene or subject and its resistance is a function of the intensity of incoming light. If the intensity of such light is weaker, the energization of the electromagnet 44 is delayed and the shutter remains open for a longer interval of time. When the electromagnet 44 is energized, it attracts the lower arm of the blocking lever 45 against the opposition of the spring 45b whereby the lever 45 releases the trailing ring 26 which is immediately returned to uncocked position by spring 32 to thereby close to the shutter through the intermediary of pins 29.

The lamp 51 will light up as soon as the leading ring 25 moves the shutter blades 27 to open position. The movable contact 49a of the switch 49 is then permitted to enter the notch 47 of the cam 46 by moving in the direction indicated by an arrow h. The lamp 51 remains lighted until the trailing ring 26 returns to uncocked position by moving in the direction indicated by arrow f. The lobe 8a of the cam 48 then moves the movable contact 49a back to the illustrated position and the circuit of the lamp 51 is opened. This lamp is positioned in such a way that it is readily observable. The operator knows that the shutter is open when the light is on.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is:

1. In a shutter for photographic cameras, shutter blade means movable between open and closed positions; composite actuating means operative to move said blade means between such positions, said actuating means comprising movable setting means directly coupled with said blade means and drive means for said setting means; and indicating means responsive to operation of said actuating means to indicate at least one position of said blade means, said indicating means comprising an electric signal generator, switch means connected in circuit with said signal generator, and trip means provided on said setting means for effecting closing of said switch means in response to movement of said blade means to open position.

2. A structure as set forth in claim 1, wherein said signal generator is a lamp.

3. A structure as set forth in claim 1, wherein said setting means comprises a leading ring rotatable from a cocked to an uncocked position to thereby move said blade means to open position and a trailing ring rotatable from a cocked to an uncocked position to thereby move said blade means to closed position, said trip means comprising first cam means provided on said leading ring and arranged to effect closing of said switch means on movement of said leading ring to uncocked position, and second cam means provided on said trailing ring and arranged to effect opening of said switch means on movement of said trailing ring to uncocked position.

4. In a shutter for photographic cameras, shutter blade means movable between open and closed positions; actuating means operative to move said blade means between such positions; said actuating means comprising a first member movable from a first to a second position to thereby effect movement of said blade means to open position and a second member movable from a first to a second position to thereby effect movement of said blade means to closed position; and indicating means for indicating the positions of said blade means, said indicating means comprising an electric signal generator operative to produce detectable signals, means for operating said signal generator in response to movement of said first member to second position and for terminating the operation of said signal generator in response to movement of said second member to second position.

References Cited

UNITED STATES PATENTS

| 237,165 | 2/1881 | Buchanan | 95—53 |
| 710,717 | 10/1902 | Sebba et al. | 95—1 X |
| 3,027,800 | 4/1962 | Leuschke | 95—53.6 XR |
| 3,038,437 | 6/1962 | Egan | 95—53 XR |

NORTON ANSHER, Primary Examiner

LEO H. McCORMICK, Jr., Assistant Examiner

U.S. Cl. X.R.

116—114.10